United States Patent
Poegel et al.

(10) Patent No.: US 8,107,513 B2
(45) Date of Patent: Jan. 31, 2012

(54) DIFFERENTIAL DETECTION UNIT FOR THE ZIGBEE 802.15.4 STANDARD

(75) Inventors: Frank Poegel, Dresden (DE); Tilo Ferchland, Dresden (DE); Thomas Hanusch, Coswig (DE)

(73) Assignee: Atmel Corporation, San Jose, CA (US)

( * ) Notice: Subject to any disclaimer, the term of this patent is extended or adjusted under 35 U.S.C. 154(b) by 850 days.

(21) Appl. No.: 11/917,150

(22) PCT Filed: May 31, 2006

(86) PCT No.: PCT/EP2006/005174
§ 371 (c)(1),
(2), (4) Date: Jul. 1, 2008

(87) PCT Pub. No.: WO2006/131243
PCT Pub. Date: Dec. 14, 2006

(65) Prior Publication Data
US 2010/0254304 A1   Oct. 7, 2010

(30) Foreign Application Priority Data
Jun. 7, 2005 (DE) .................. 10 2005 026 093

(51) Int. Cl.
*H04B 1/00* (2006.01)
(52) U.S. Cl. ..................................................... 375/150
(58) Field of Classification Search .................. 375/142, 375/144, 145, 147–150, 343
See application file for complete search history.

(56) References Cited

U.S. PATENT DOCUMENTS

| | | |
|---|---|---|
| 2005/0105596 A1 | 5/2005 | Fan et al. |
| 2005/0105597 A1 | 5/2005 | Hwang et al. |
| 2005/0116860 A1* | 6/2005 | Kishimoto et al. ...... 342/357.12 |
| 2005/0265430 A1* | 12/2005 | Ozluturk et al. .............. 375/145 |

OTHER PUBLICATIONS

Qicai Shi et al: "A new chip-level differential detection system for DS-CDMA" ICC 2002. 2002 IEEE International Conference on Communications. Conference Proceedings. New York, NY, Apr. 28-May 2, 2002 IEEE International Conference on Communications, New York, NY : IEEE , US, Bd. vol. 1 of 5, Apr. 28, 2002 , pp. 544-547.

Karen E. L. Scott et al.: "Design and Performance of IEEE 802.15.4 Compliant MMSE Receivers", Nov. 7-10, 2004, vol. 2, pp. 2051-2055.

* cited by examiner

*Primary Examiner* — Don N Vo
(74) *Attorney, Agent, or Firm* — Baker Botts L.L.P.

(57) ABSTRACT

In one embodiment, a detection unit includes a sequence providing unit to provide a third group of derived sequences. The sequence providing unit has a counting unit and multiplexers connected to the counting unit. Fixed values are applied at the inputs of the multiplexers and the sequence providing unit provides the derived sequences of the third group at the outputs of the multiplexers. The third group for each first pseudo noise (PN) sequence has a derived sequence assigned to the first PN sequence. The detection unit includes a correlation unit, which is connected to the sequence providing unit and formed to calculate correlation results by correlating the differentially demodulated signal with each derived sequence of the third group. The detection unit includes an evaluation unit, which is connected to the correlation unit and is formed to derive the values of the data symbols by evaluating the correlation results.

21 Claims, 4 Drawing Sheets

DIFFERENTIAL DETECTION UNIT FOR THE ZIGBEE 802.15.4 STANDARD

RELATED APPLICATIONS

This application is a national stage application of PCT/EP2006/005174, which was filed on May 31, 2006, and which claims priority to German Patent Application No.: DE 102005026093, which was filed on Jul. 7, 2005.

The present invention relates to a detection unit for detecting data symbols contained in a differentially demodulated signal. The invention relates furthermore to a transmitting/receiving device and to an integrated circuit with such a detection unit.

BACKGROUND

The invention falls within the field of data transmission. Although it can be used in principle in any digital communication system, the present invention and its underlying problem will be explained below with reference to a "ZigBee" communication system in accordance with IEEE 802.15.4.

So-called "Wireless Personal Area Networks" (WPANs) can be used for the wireless transmission of information over relatively short distances (about 10 m). In contrast to "Wireless Local Area Networks" (WLANs), WPANs require little or even no infrastructure for data transmission, so that small, simple, energy-efficient, and cost-effective devices can be implemented for a broad range of applications.

Standard IEEE 802.15.4 specifies low-rate WPANs, which are suitable with raw data rates up to a maximum of 250 kb/s and stationary or mobile devices for applications in industrial monitoring and control, in sensor networks, in automation, and in the field of computer peripherals and for interactive games. In addition to a very simple and cost-effective implementability of devices, an extremely low power requirement of devices is of critical importance for such applications. Thus, an objective of this standard is a battery life of several months to several years.

At the level of the physical layer, in the virtually globally available 2.4 GHz ISM band (industrial, scientific, medical) for raw data rates of fB=250 kbit/s, the IEEE standard 802.15.4 specifies a band spread (spreading) with a chip rate of fC=2 Mchip/s and an offset QPSK modulation (quadrature phase shift keying) with a symbol rate of fS=62.5 ksymbol/s.

In an 802.15.4 transmitter for the ISM band, the data stream to be transmitted is first converted to a sequence of PN sequences (pseudo noise) with the use of four data bits in each symbol period (TS=1/fS=16 µs), in order to select a PN sequence for a sequence set of a total of 16 PN sequences. Each symbol of four data bits is assigned in this manner a symbol value-specific PN sequence from 32 PN Chips (chip period TC=TS/32=500 ns=1/fC), which is transmitted instead of the four data bits. The sequence set of 16 "quasi-orthogonal" PN sequences, specified in the standard, in this case comprises a first group of eight first PN sequences, which differ from one another only by a cyclic shift of their chip values, and a second group of eight second PN sequences, which also differ from one another only by a cyclic shift of their chip values and from one of the first PN sequences only by an inversion of each second chip value (see IEEE Standard 802.15.4-2003, Chapter 6.5.2.3).

The PN sequences assigned to the successive symbols are linked together and then offset QPSK modulated (quadrature phase shift keying) by modulating, with half-sine pulse shaping, the even-indexed PN chips (0, 2, 4, . . . ) onto the in-phase (I) carrier and the odd-indexed PN chips (1, 3, 5, . . . ) onto the quadrature-phase (Q) carrier. To form an offset, the quadrature-phase chips are delayed by a chip period TC with respect to the in-phase chips (see IEEE Std 802.15.4-2003, Chapter 6.5.2.4).

Both coherent and incoherent approaches are known per se receiver-side to detect data symbols present in an incoming signal. Whereas in coherent approaches the incoming signal is converted into the complex envelope (baseband) with use of a carrier wave of the same frequency and phase and obtained from a carrier control circuit, in incoherent approaches at least the appropriates of the phase, within limits possibly also the appropriateness of the frequency of the carrier wave, can be dispensed with. Because of the higher realization cost in coherent approaches, which is also associated with an increased power requirement, in the current invention an incoherent receiver is used in which the incoming signal is converted at least not in-phase into the complex envelope and the resulting baseband signal is demodulated differentially.

Furthermore, it is known per se to multiply the data symbols from several communication participants transmit-side in each case with a participant-specific PN sequence from a sequence set of orthogonal PN sequences, to transmit the composite signal, and to detect receiver-side the data symbols of a specific participant in that the received composite signal is correlated with the PN sequence of this participant and subsequently decided. References is made in this regard, e.g., to the textbook "Nachrichtenübertragung" [Message Transmission] by Karl-Dirk Kammeyer, 3$^{rd}$ edition, B. G. Teubner, Stuttgart, ISBN 3-519-26142-1 (pages 632-635).

SUMMARY

In view of this background, the object of the invention is to provide a detection unit for detecting data symbols contained in a differentially demodulated signal that enables energy-efficient and simple implementation of transmitting/receiving devices, e.g., according to IEEE 802.15.4, and yet has a high detection efficiency, i.e., a low error rate (symbol, bit, frame error rate, etc.) also with interference effects such as channel distortions and/or noise. It is furthermore the object of the invention to provide a suitable transmitting/receiving device and an integrated circuit.

This object is achieved according to the invention by a detection unit, a transmitting/receiving device, and an integrated circuit with the features of claims 1, 22, and 23, respectively.

Accordingly, provided are: a detection unit for detecting data symbols which are contained in a differentially demodulated signal and to which transmit-side in each case a PN sequence from a sequence set can be assigned, which has a first group of first PN sequences and a second group of second PN sequences, whereby the first and second PN sequences within their respective group differ from one another only by a cyclic shift in their chip values and whereby the second group for each first PN sequence has a corresponding second PN sequence, which differs from the first PN sequence only by an inversion of each second chip value, comprising a) a sequence providing unit, which is formed to provide a third group of derived sequences, whereby the third group for each first PN sequence has a derived sequence, which is assigned to said first PN sequence and can be derived therefrom by means of logic operations, but is not identical thereto, and whereby the derived sequences of the third group differ from one another only by a cyclic shift of their chip values, b) a correlation unit which is connected to the sequence providing unit and is formed to calculate correlation results by correlating the differentially demodulated signal with each derived sequence of the third group, and c) an evaluation unit which is connected to the correlation unit and is formed to derive the values of the data symbols by evaluating the correlation results.

The transmitting/receiving device of the invention and the integrated circuit of the invention each have this type of detection unit.

The essence of the invention is to provide a third group of derived sequences adapted to the differential demodulation and to correlate the differentially demodulated signal with each derived sequence of the third group. The derived sequences of the third group are not identical to the PN sequences usable transmit-side—but derived therefrom—and differ from one another—in contrast to the PN sequences usable transmit-side—only by a cyclic shift of their chip values. This makes it possible to correctly detect (decide) a differentially demodulated signal generated transmit-side, e.g., according to IEEE 802.15.4. In addition, the particular properties of the derived sequences enable extremely simple and energy-efficient implementations of the detection unit and thereby the transmitting/receiving devices.

This is advantageous particularly when—as in applications in industrial monitoring and control, sensor networks, and automation, or in the field of computer peripherals—an extremely low power requirement and a very simple realizability are indispensable. Although the invention is not limited to the IEEE standard 802.15.4, this is the case for this standard by way of example in transmitting/receiving devices.

The efficiency of the detection unit of the invention is very high. Thus, the error rate (symbol, bit, frame error rate, etc.) during detection is very low according to simulations performed by the applicant also under interfering effects such as channel distortions and noise.

Advantageous embodiments and developments of the invention are to be derived from the dependent claims and from the description with reference to the drawing.

In an advantageous embodiment, the sequence providing unit has precisely one memory means, which is formed to store precisely one (i.e., only one) of the derived sequences. A memory means, whose size is dimensioned in this way, can be advantageously very simply implemented and operated with saving of power.

The memory means preferably is made hereby as a feedback shift register. The very simple structure of a shift register of series-connected register cells makes possible a very efficient and simple realization of the sequence providing unit with a very low power requirement. Thus, e.g., neither calculation of memory addresses nor a complex control logic is required for the shift register.

The sequence providing unit hereby preferably provides the derived sequences of the third group at the outputs of the respective (several) register cells of the shift register. For this purpose, means are provided for clocking the feedback shift register in the chip clock. All derived sequences of the third group with or without a time offset among each other can be provided very simply in this way.

In another advantageous embodiment, the sequence providing unit has a counting unit and multiplexer connected thereto, whereby fixed values can be applied at the inputs of the multiplexer and the sequence providing unit is formed to provide the derived sequences of the third group at the outputs of the multiplexers. This type of structure comprising logic elements also makes possible a very efficient and simple realization of the sequence providing unit with a very low power requirement.

In another embodiment, the number n of the at least two derived sequences of the third group corresponds to the number the first PN sequences in the first group and this in turn to the number of the second PN sequences in the second group. Thereby, the number of the derived sequences of the third group is only half as high as the number of the overall usable PN sequences transmit-side. This advantageously makes possible a simpler realization particularly of the correlation unit but also of the sequence providing unit and of the evaluation unit.

The correlation unit preferably comprises n multiplier units and n downstream integration units, whereby the multiplier units, each connected to the sequence providing unit and the differential demodulator (or equalizer), calculate n product signals by multiplying (individually delayed or not delayed and present in the chip clock) signal values of the demodulated (and optionally equalized) signal by (optionally also higher-level [more than two-level]) chip values in each case of one of the derived sequences of the third group, and then each integration unit per symbol period provides a correlation result by adding a number of signal values of the corresponding product signal. This type of realization of the correlation unit is very simple, requires very little operating energy, and enables a high efficiency in the detection error rate.

If the derived sequences of the third group have two-level chip values (e.g., +/−1), the multiplier units can be realized advantageously as extremely simply constructed means for sign reversal.

Preferably, one chip value of each derived sequence is not considered in the correlation calculation. Despite the differential demodulation, two successive data symbols can be advantageously decided independent of one another in this way.

According to another embodiment, the evaluation unit evaluates in a parallel manner the n correlation results per symbol period by evaluating them substantially simultaneously, i.e., during one chip period or during a few chip periods of each symbol period. In this way, the results of the correlation result evaluation are completely available as early as possible, so that the decisions about the data symbol values transmitted with the greatest probability can be made advantageously in each case as early as possible.

Preferably, the evaluation unit comprises a parallel maximum value determination unit and a downstream allocation unit, whereby the parallel maximum value determination unit, connected to the integration units of the correlation unit, compares the n correlation results with one another in amount per symbol period substantially simultaneously, i.e., during one chip period or during a few chip periods of each symbol period, and determines as the result the signed value of the maximum-value correlation result and a sequence index with values between 0 and n−1, which indicates which of the n derived sequences of the third group is to be assigned to this signed value, and whereby the allocation unit determines a value of one of the data symbols from the sequence index and the sign of the signed value of the maximum-value correlation result. An evaluation unit, which provides decisions, on data symbol values as early as possible, can be implemented simply and energy efficiently in this way.

According to a preferred embodiment, in which the third group comprises at least four derived sequences, the correlation unit has delay elements, which are arranged in such a way that per symbol period two first results of the correlation results are provided in the same chip period and n−2 second results of the correlation results in following chip periods. The evaluation unit in this case evaluates serially the n correlation results per symbol period by evaluating the first correlation results during a first chip period and one each of the second correlation results during the following chip periods. The evaluation unit can be constructed more simply due to the serial provision and evaluation of the correlation results each time in successive chip periods. In addition, the operating energy is consumed more uniformly over time or fewer peak currents occur in comparison with the parallel implementation. This is advantageous both with respect to interfering radiation and in regard to the battery lifetime.

Preferably, the delay elements in this case are arranged in the signal path upstream of the multiplier units, because in this way the delay of the correlation results is achieved with the lowest possible (hardware) effort.

The evaluation unit preferably comprises a serial maximum value determination unit and a downstream allocation unit. In this case, the serial maximum value determination unit during the first chip period compares the first correlation results in amount and determines as the result the signed value of the first correlation result that has the highest amount, and a sequence index which indicates which of the derived sequences of the third group is to be assigned to this signed value. During the following chip periods, the serial maximum value determination unit compares one each of the second correlation results in amount with the result determined in each case during the preceding chip period and determines as the result the signed value that has the highest amount, and a sequence index which indicates which of the derived sequences is to be assigned to this signed value. This step is carried out so often until all second correlation results are considered and thus the signed value of the maximum-value correlation result and a sequence index (with values between 0 and n−1) are determined that indicates which of the n derived sequences is to be assigned to this signed value. The allocation unit finally determines a value of one of the data symbols from the sequence index and the sign of the signed value of the maximum-value correlation result. This evaluation unit is advantageously constructed very simply, requires extremely little energy during operation, and is notable for a high efficiency in detection error rate.

Preferably, the serial maximum value determination unit comprises a first multiplexer, a second multiplexer, and a logic unit. The first multiplexer hereby has a first input, which is connected to a first integration unit of the correlation unit, and a second input, which is connected to the first output of the logic unit. The second multiplexer has n−1 inputs, which are connected to the n−1 remaining ("second") integration units. The logic unit has two inputs, which are connected to the two outputs of the two multiplexers, and two outputs. The first multiplexer is controlled in such a way that during the first chip period it conducts to its output the first correlation result applied at its first input and in the following chip periods the value applied at its second input, whereas the second multiplexer is controlled in such a way that during the first chip period it conducts to its output the first correlation result applied at one of its inputs and in the following chip periods one each of the second correlation results applied at its other inputs. The logic unit in each case compares in amount the two values conducted by both multiplexers and determines the signed value of the value higher in amount and the sequence index of the derived sequence to be assigned to this signed value. It provides the signed value at the first output and the sequence index at the second output. This serial maximum value determination unit is advantageously constructed very simply. In addition, the operating energy is consumed more uniformly over time or fewer peak currents occur in comparison with the parallel implementation. This is advantageous both with respect to interfering radiation and in regard to the battery lifetime.

Preferably, the allocation unit determines the value of one of the data symbols that is assigned the first PN sequence of the first group that is assigned the derived sequence with this sequence index (value), if the signed value of the maximum-value correlation result is positive, and otherwise the value of one of the data symbols that is assigned the second PN sequence of the second group that is assigned the sequence inverse to the derived sequence with this sequence index (value). This type of allocation unit is advantageously constructed very simply and requires extremely little power during operation.

In another embodiment, the derived chips (i.e., the chips of a derived sequence) with a first positive index (i.e., all chips other than the first one) each have a value that can be derived from an XOR operation of the PN chip (i.e., the chip of the first PN sequence to which the derived sequence is assigned) with said first positive index with the PN chip preceding index-wise (and thereby in time). The first chip (with index zero) derived index-wise (and in time) preferably has a value that can be derived from an XOR operation of the index-wise first PN chip (with index zero) with the index-wise last PN chip. The sequence providing unit, the correlation unit, and the evaluation unit can be realized very simply and with saving of power by using derived sequences of this type.

The invention will be described in greater detail hereinafter with use of the exemplary embodiments shown in the schematic figures of the drawing. Here,

DETAILED DESCRIPTION OF EXAMPLE EMBODIMENTS

In the figures, the same and functionally identical elements and signals, if not specified otherwise, are provided with the same reference characters.

Figure 1:
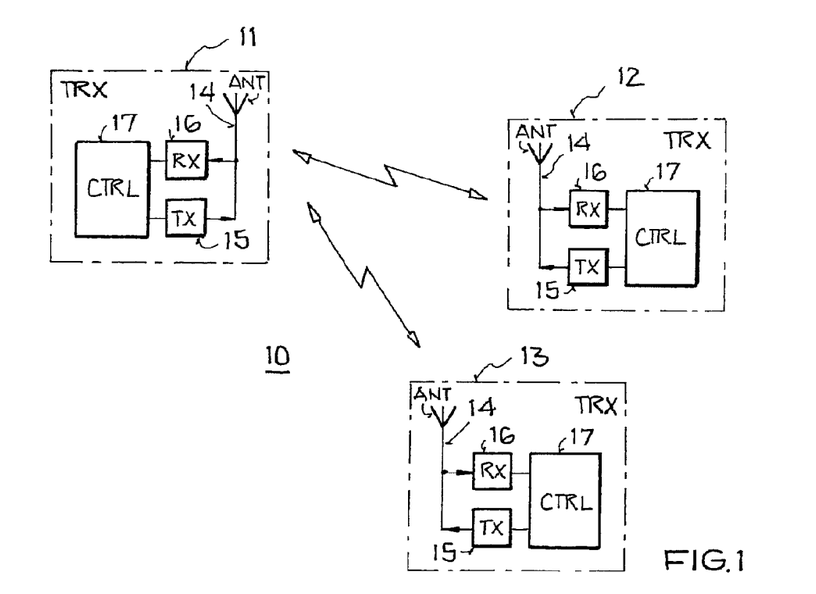
FIG. 1 shows a "Wireless Personal Area Network" (WPAN) according to IEEE Standard 802.15.4 with transmitting/receiving devices (TRX) of the invention.

FIG. 1 shows an example of a "Wireless Personal Area Network" (WPAN) 10 according to the IEEE standard 802.15.4. It comprises three transmitting/receiving devices (transceiver, TRX) 11-13 in the form of stationary or mobile devices, which exchange information in a wireless manner by means of radio signals. Transmitting/receiving device 11 is a so-called full-function device, which assumes the function of the WPAN coordinator, whereas transmitting/receiving devices 12, 13 are so-called reduced-function devices, which are assigned to full-function device 11 and can only exchange data with said device. Apart from the star network topology depicted in FIG. 1, in which bidirectional data transmission can only occur between one of the reduced-function devices 12, 13 and the full-function device 11, but not between the reduced function devices 12, 13, the standard also provides so-called "peer-to-peer" topologies, in which all full-function devices (of which one assumes the role of the WPAN coordinator) can communicate with all other full-function devices.

Transmitting/receiving devices 11-13 each comprise an antenna 14, a transmitting unit (transmitter, TX) 15 connected to the antenna, a receiving unit (receiver, RX) 16 connected to the antenna, and a control unit (control unit, CTRL) 17, connected to the transmitting and receiving unit, to control transmitting and receiving units 15, 16. Furthermore, transmitting/receiving units 11-13 each contain a power supply unit, not shown in FIG. 1, in the form of a battery, etc., to supply power to units 15-17, and possibly other components such as sensors, interfaces, etc.

It will be assumed in the following text that the data transmission occurs in the 2.4 GHz ISM band (industrial, scientific, medical). Transmitting unit 15 of each transmitting/receiving device converts the data stream to be transmitted in each case according to the IEEE Standard 802.15.4 into a radio signal to be emitted over its antenna 14 by first converting the data stream to be transmitted in each case, as described in the introduction to the description, to four bit wide symbols d0, d1, d2, ... and these into successive PN sequences (e.g., P5, P4, P7, if d0=5, d1=4, d2=7). The successive PN sequences are then offset QPSK modulated (quadrature phase shift keying) with half-sinus pulse formation.

Accordingly, receiving unit 16 of each transmitting/receiving device converts a radio signal received from its antenna 14 (and generated by the transmitting unit of another transmitting/receiving device according to the IEEE Standard 802.15.4) without errors if possible into the transmitted data by demodulating the radio signal inter alia and detecting (deciding) the data.

Transmitting unit 15 and receiving unit 16 of a transmitting/receiving device are hereby part of an integrated circuit (IC) (not shown in FIG. 1), e.g., an ASICs (application specific integrated circuit), whereas control unit 17 is realized by means of a microcontroller (also not shown). Advantageously, the transmitting/receiving device can also have only one IC (e.g., made as an ASIC), which senses the functions of transmitting unit 15, receiving unit 16, and control unit 17.

Figure 2:
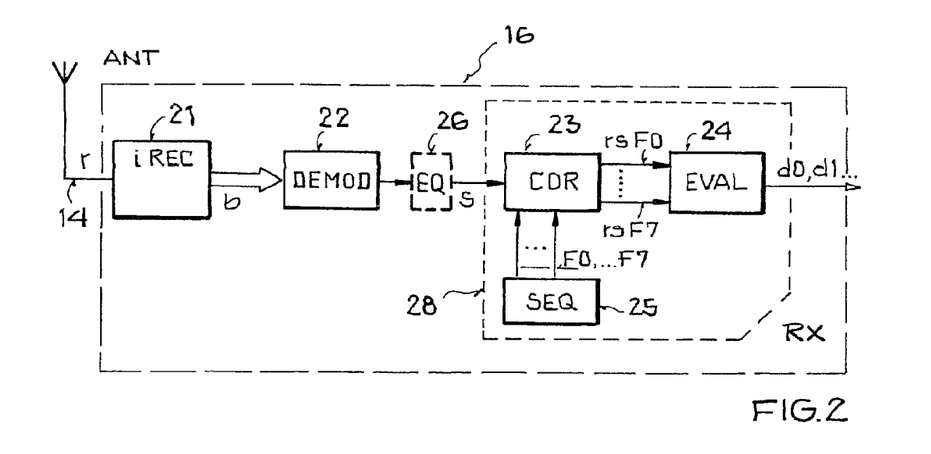
FIG. 2 shows an incoherent receiving unit with a detection unit of the invention 28.

FIG. 2 shows a block diagram of an incoherent receiving unit (RX) 16, which comprises the following functional blocks connected in series: an internal receiver (iREC) 21, a differential demodulator (DEMOD) 22, and a detection unit 28 of the invention, which has a correlation unit (COR) 23 and a downstream evaluation unit (EVAL) 24, as well as a sequence providing unit (SEQ) 25 connected to correlation unit 23. In addition, receiving unit 16 optionally has an equalizer (EQ) 26 between demodulator 22 and detection unit 28.

Internal receiver 21 connected to antenna 14 of the transmitting/receiving device converts the received radio signal r into a complex baseband signal b (envelope), which has complex-valued sampling values in the clock of the PN chips, used transmit-side, of the PN sequences; i.e., in chip clock fC=2 Mchip/s=1/TC=½₅₀₀ ns. Each complex sampling value hereby comprises a real part (in-phase component I) and an imaginary part (quadrature component Q). Complex-valued signals like the baseband signal b are shown in the figures by arrows with double lines.

Internal receiver 21 furthermore has a synchronization unit (SYNC) 27, which carries out a symbol and chip clock synchronization.

The baseband signal b is then converted by differential demodulator 22 into a demodulated signal, which has real-valued signal values in the chip clock fC. Advantageously, differential demodulator 22 generates a demodulated signal whose signal value has so-called soft information values (higher level, e.g., 4-bit-wide signal values) instead of the so-called hard bits (i.e., two-level, binary values).

The demodulated signal is then optionally equalized. Equalizer 26 provided for this purpose determines preferably per symbol period TS=1/fS=16 µs=32*TC a mean of the demodulated signal and releases this signal subsequently by subtracting the mean from a direct component. Alternatively or in addition, equalizer 26 may have a filter, e.g., a high-pass filter. The differentially demodulated (and optionally equalized) signal is designated with an s hereafter.

Next, the data symbols d0, d1, d2, ..., contained in the differentially demodulated (and optionally equalized) signal s, are detected, i.e., decided, by detection unit 28 of the invention. For this purpose, the signal s present in the chip clock fC (with, for example, four-bit-wide signal values) is first correlated in correlation unit (COR) 23 with so-called derived sequences F0, F1, ..., F7, which are provided by sequence providing unit 25. This leads to the correlation results rsF0, rsF1, ..., rsF7, which represent a measure for the conformity of the signal s with the particular derived sequence F0, F1, ..., or F7. The correlation results are generated in the symbol clock fS=fC/32=62.5 ksymbol/s (corresponds to a symbol period of TS). The correlation results rsF0, rsF1, ..., rsF7 are finally evaluated in evaluation unit (EVAL) 24 and the data symbols d0, d1, d2, ... are detected (decided).

Due to detection unit 28 of the invention, which will be described in greater detail hereinafter, transmitting/receiving devices 11-13 of FIG. 1 are notable for a very simple realizability, a very low power requirement, and a high efficiency (bit error rate or the like depending on interfering effects such as noise and/or channel distortions).

It will be described hereinafter how the derived sequences F0, F1, ..., F7 provided by sequence providing unit 25 according to FIG. 2 are obtained. The following table shows both PN sequences P0, P1, ... to be used transmit-side according to IEEE 802.15.4 and also the derived sequence F0, F1, ... assigned to PN sequences of the invention.

In regard to the PN sequences P0, P1, P2, ... to be used transmit-side, it must be determined first that a sequence set with a total of 16 PN sequences P0, P1, ..., P15 is specified. Each PN sequence in this case comprises 32 so-called chips, each of which can assume a value of logic zero (0) or one (1). As is evident from the table, e.g., the first 10 chips of the PN sequence P5 assume the values 0 0 1 1 0 1 0 1 0 0.

For the chips, e.g., of PN sequence P5, the parameters P5c0 (first chip (c0) of P5), P5c1 (second chip (c1)), ..., P5c30, P5c31 (last chip (c31) are introduced to simplify the description. This also applies to the other PN sequences, so that Picj designates the chip with index j (i.e., the (j+1)-th chip) of the PN sequence with index i (Pi), whereby i=0, 1, ..., 15 and j=0, 1, ..., 31. Furthermore, to better differentiate the chips of the PN sequences from those of the derived sequences, the former are designated as PN chips.

If all 16 PN sequences P0, P1, ..., P15 of the sequence set are divided into a first group PG1 of the eight "first" PN sequences P0, P1, ..., P7 and a second group PG2 of the eight "second" PN sequences P8, P9, ..., P15, it is evident further from the table that the first PN sequences P0, P1, ..., P7 differ from each other only by a cyclic shift of their chip values. Thus, e.g., the bit pattern {1 1 0 1 1 0}, occurring at the start of the PN sequence P0, is evident—in a cyclic expansion—in the PN sequence P1 starting at the PN chip P1c4, in the PN sequence P2 starting at P2c8, in P3 starting at P3c12, in P4 starting at P4c16, ..., and finally in P7 starting at P7c28. The second PN sequences P8, P9, ..., P15 as well differ from one another only by a cyclic shift of the chip values.

```
P0:   1 1 0 1 1 0 0 1 1 1 0 0 0 0 1 1
F0:   + + + − − − − − − + + + − + + +
P1:   1 1 1 0 1 1 0 1 1 0 0 1 1 1 0 0
F1:   + + − − + + + − − − − − + + + −
P2:   0 0 1 0 1 1 1 0 1 1 0 1 1 0 0 1
F2:   − + + − + + − − + + + − − − − −
P3:   0 0 1 0 0 0 1 0 1 1 1 0 1 1 0 1
F3:   + + + − − + + − + + − + + + − −
P4:   0 1 0 1 0 0 1 0 0 0 1 0 1 1 1 0
F4:   + − + − + + + − − + + − + + − −
P5:   0 0 1 1 0 1 0 1 0 0 1 0 0 0 1 0
F5:   − + + + + − − + + − + − − + + +
P6:   1 1 0 0 0 0 1 1 0 1 0 1 0 0 1 0
F6:   − + + + − + + + + − + − + + + −
P7:   1 0 0 1 1 1 0 0 0 0 1 1 0 1 0 1
F7:   − − − − + + + − + + + + − + − +
P8:   1 0 0 0 1 1 0 0 1 0 0 1 0 1 1 0
F8:   − − − + + + + + − − − + − − − −
P9:   1 0 1 1 1 0 0 0 1 1 0 0 1 0 0 1
F9:   − − + + − − + + + + + − − − − +
P10:  0 1 1 1 1 0 1 1 1 0 0 0 1 1 0 0
F10:  + − − + + − − − + + + + + + + +
P11:  0 1 1 1 0 1 1 1 1 0 1 1 1 0 0 0
F11:  − − − + + − − + − + + − − − + +
P12:  0 0 0 0 0 1 1 1 0 1 1 1 1 0 1 1
F12:  − + − + − − + + − + + − − + + −
P13:  0 1 1 0 0 0 0 0 1 1 1 0 1 1 1 1
F13:  + − − − + − + − − + + − − + − −
P14:  1 0 0 1 0 1 1 0 0 0 0 0 1 1 1 0
F14:  + − − − + − − − + − − − − + + −
P15:  1 1 0 0 1 0 0 1 0 1 1 0 0 0 0 0
F15:  + + + + + − − − + − − − − + − + −
```

```
P0:   1 0 1 0 0 1 0 0 0 1 0 1 1 1 0
F0:   − + − + + + − − + + − + + − −
P1:   0 1 1 0 1 0 1 0 0 1 0 0 0 1 0
F1:   + + + + − + − + + + − − + + −
P2:   1 0 0 0 0 1 1 0 1 0 1 0 0 1 0
F2:   + + + − + + + + − + − + + + −
P3:   0 0 1 1 1 0 0 0 0 1 1 0 1 0 1
F3:   − − − − + + + − + + + + − + −
P4:   1 0 1 1 0 0 1 1 1 0 0 0 0 1 1
F4:   + + − − − − − + + + − + + + +
P5:   1 1 0 1 1 0 1 1 0 0 1 1 1 0 0
F5:   + − − + + + − − − − − + + + +
P6:   0 1 0 1 1 0 1 0 1 0 1 1 0 0 1
F6:   + + − + + − − + + + − − − − −
P7:   0 1 0 0 0 1 0 1 1 1 0 1 1 0 1
F7:   + + − − + + − + + − − + + + − −
P8:   0 0 0 0 1 1 1 0 1 1 1 1 0 1 1
F8:   + − + − − − + + − + − − − + +
P9:   1 1 0 0 0 0 0 0 1 1 1 0 1 1 1
F9:   − − − − + − + − − − + + − − +
P10:  0 0 1 0 1 1 0 0 0 0 0 0 1 1 1
F10:  − − − + − − + + − + + − − − +
P11:  1 0 0 1 0 0 1 0 1 1 0 0 0 0 0
F11:  + + + + − − − + − − − − + − + +
P12:  0 0 0 1 1 0 0 1 0 0 1 0 1 1 0
F12:  − − + + + + + − + + − − + + − −
P13:  0 1 1 1 0 0 0 1 1 0 0 1 0 0 1
F13:  − + + − − − + + + + + − − −
P14:  1 1 1 1 0 1 1 1 0 0 0 1 1 0 0
F14:  − − + − − + + − − − + + + + +
P15:  1 1 1 0 1 1 1 1 0 1 1 1 0 0 0
F15:  − − + + − − + − − + + − − − +
```

Pi: PN sequence i (transmit-side) (Pic0 Pic1 Pic2 Pic3 ... Pic30 Pic31)
Fi: sequence derived from Pi (Fic0 Fic1 Fic2 Fic3 ... Fic30 Fic31)

It is evident furthermore that for each first PN sequence of the first group PG1 there is a second PN sequence of the second group PG2, which differs from this first PN sequence of the first group PG1 only by every second chip value—namely, by an inversion of every second chip value. If, e.g., the PN sequences P0 from PG1 and P8 from PG2 in the table are compared, it is found that the even-indexed PN chips have identical values (P0$c$0=P8$c$0=1; P0$c$2=P8$c$2=0; P0$c$4=P8$c$4=1; etc.), whereas the odd-indexed PN chips assume different values (inverted to one another) (P0$c$1=1, P8$c$1=0, P0$c$3=1, P8$c$3=0; P0$c$5=0, P8$c$5=1, etc.).

Each PN sequence according to the invention is assigned a nonidentical derived sequence, matched to the differential demodulation, for example, the derived sequence F0, listed in the table below P0, to the PN sequence P0, the derived sequence F1 to the PN sequence P1, etc. The chips of the derived sequences, here designated as derived chips, can assume the antipodal values +1 and −1, whereby for reasons of clarity only the sign of these values is entered in the table. In analogy to the designation for the PN chips introduced above, the derived chip with the index j of the derived sequence with the index i is designated below with Ficj, whereby i=0, 1, ..., 15 and j=0, 1, ..., 31.

The values of the derived chips result as follows from the value of the PN chips. In order to form, e.g., the value of the derived chip F0c2, which according to the table is +1, the value of the PN chip P0c2=0, entered directly above in the table, is to be logically XORed with the value of the PN chip P0c1=1, entered to the left (i.e., preceding in time) of P0c2. The logic XOR operation in this case produces a value of logic 1, which is assigned the antipodal value +1 entered in the table for F0c2. Accordingly, the value of F0c4 from P0c4 XOR P0c3=1 XOR 1=0 results for the value of −1 entered in the table for F0c4, because the logic zero is assigned an antipodal value of −1. This derivation rule applies to all derived chips with positive even index. If, therefore, Ficj designates the derived chip with the index j of the derived sequence with the index i and Picj and Picn the PN chip with the index j or n of the PN sequence with the index i, for positive even indexes j the derived chip Ficj for i=0, 1, ..., 15 is given as $$Ficj=2*(Picj\ XOR\ Picn)-1 \text{ with } n=j-1 \text{ for } j=2, 4, 6, \ldots, 30, \quad (1)$$

whereby the multiplication of the result of the XOR operation with the factor 2 and the subsequent subtraction of 1 is to reflect the assignment of the logic values of 0 and 1 to the antipodal values −1 or +1.

To form the derived chip Ficj with index j=0, the last PN chip Picn with n=31 is to be used instead of the (nonexistent) PN chip Picn, preceding in time, with index n=j−1=−1, i.e., $$Ficj=2*(Picj\ XOR\ Picn)-1 \text{ with } j=0 \text{ and } n=31 \text{ for } i=0, 1, \ldots, 15. \quad (2)$$

A derivation rule similar to equation (1) applies to the derived chips Ficj with the odd index j. In this case, the result of the XOR operation is to be inverted before the assignment to antipodal values:

$$Ficj=2*INV\{Picj\ XOR\ Picn\}-1 \text{ with } n=j-1 \text{ for } j=1, 3, 5, \ldots, 31, \quad (3)$$

Here, INV{ } designates the logic inversion and i=0, 1, ..., 15 again applies.

Instead of the inversion of logic values with the subsequent assignment of logic 0 to the antipodal value −1 and of logic 1 to the antipodal value +1, naturally also a different assignment can be used, namely of logic 0 to the antipodal value +1 and of logic 1 to the antipodal value −1, and therefore the logic inversion can be omitted. The following then results as the formula $$Ficj=1-2*(Picj\ XOR\ Picn) \text{ with } n=j-1 \text{ for } j=1, 3, 5, \ldots, 31. \quad (3')$$

The use of the PN chip "current" in each case (with the index of the derived chip to be formed) and of the PN chip preceding in each case corresponds to the transmit-side division, described in the introduction to the description, of the even-(odd-)indexed PN chips on the in-phase-(I) carrier (quadrature-phase (Q) carrier) within the scope of the offset QPSK modulation (quadrature phase shift keying). Other transmit-side I/Q divisions of the PN chips require an appropriately matched formation of the derived chips.

If all 16 derived sequences F0, F1, ..., F15 are divided into a third group FG1 of the eight derived sequences F0, F1, ..., F7 and a fourth group FG2 of the eight derived sequences F8, F9, ..., F15, it is therefore evident from the table that the derived sequences F0, F1, ..., F7 of the third group FG1 differ from one another only by a cyclic shift of their chip values. Thus, e.g., the bit pattern {+++−−−}, occurring at the start of the derived sequence F0, is evident—in a cyclic expansion—in the derived sequence F1 starting at the derived chip F1c4, in the derived sequence F2 starting at F2c8, in F3 starting at F3c12, in F4 starting at F4c16, ..., and finally in F7 starting at F7c28. The derived sequences F8, F9, ..., F15 of the fourth group FG2 also differ from one another only by a cyclic shift of their chip values.

It is to be established furthermore that for each derived sequence of the third group FG1 there is a derived sequence of the fourth group FG2, which differs only by an inversion of all of its chip values. If, e.g., the derived sequence F0 from FG1 is compared with F8 from FG2 in the table, it is found that all chip values are inverted. Because this also applies to the sequence pairs F1/F9, F2/F10, etc., it is ascertained that all derived sequences of the third group FG1 are contained in inverted form in the fourth group FG2:

$$Ficj=(-1)*Fncj \text{ with } i=0, 1, \ldots, 7, n=i+8 \text{ and } j=0, 1, \ldots, 31. \quad (4)$$

In contrast to the PN sequences, in which the corresponding sequence pairs P0/P8, P1/P9 etc. differ by an inversion of each second PN chip, the corresponding pairs F0/F8, F1/F9, etc., from the derived sequences differ by an inversion of all of their chip values.

The properties indicated in the previous approaches of the derived sequences enable extremely simple realizations of correlation unit 23, evaluation unit 24, and sequence providing unit 25, and thereby detection unit 28 of FIG. 2.

Figure 3:
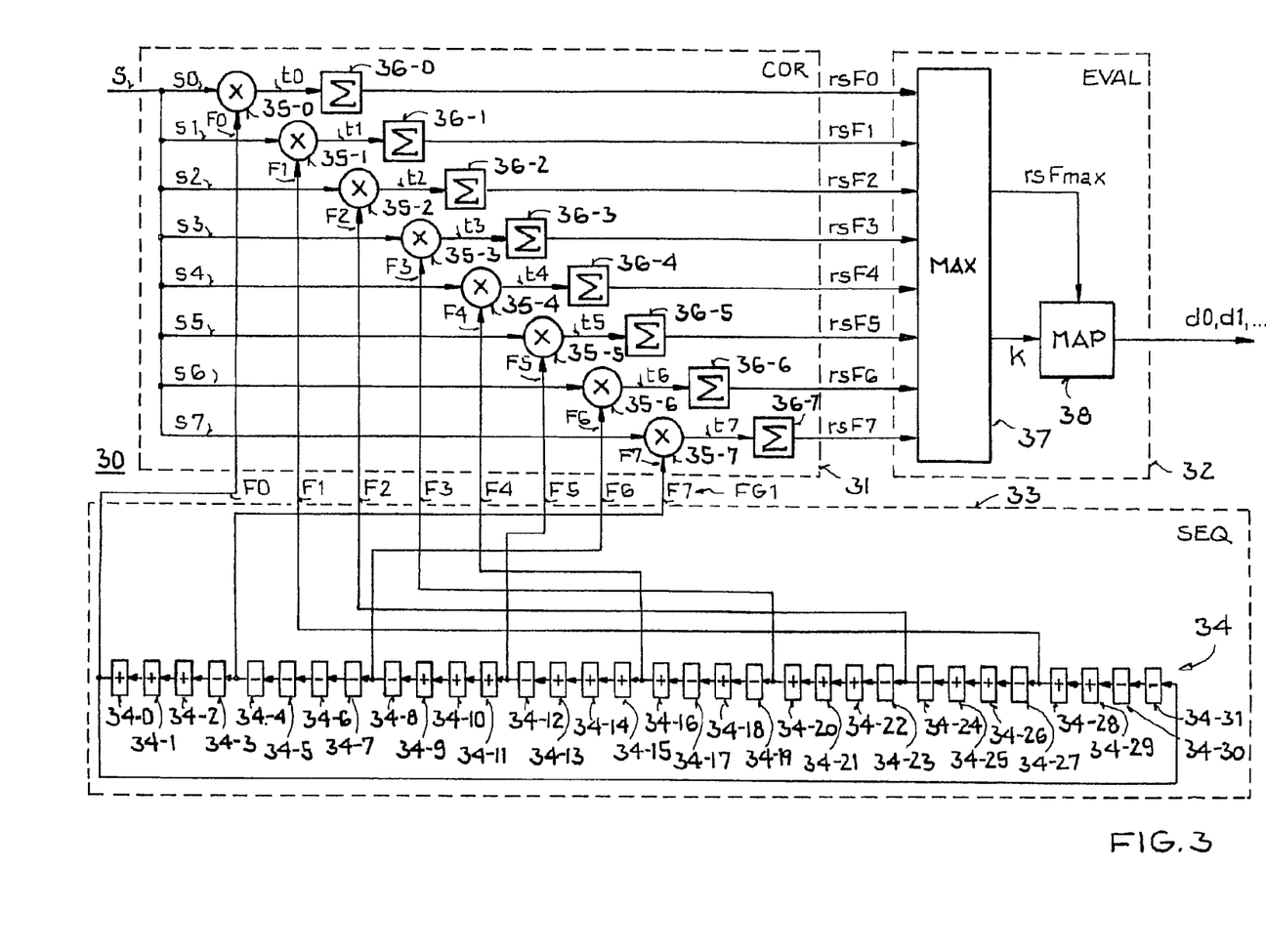
FIG. 3 shows a first exemplary embodiment of a detection unit of the invention.

FIG. 3 shows a block diagram of a first exemplary embodiment of the detection unit of the invention, in which the correlation results are provided parallel, i.e., substantially simultaneously, and evaluated. Detection unit 30 has a correlation unit (COR) 31 connected to differential demodulator 22 or equalizer 26 of FIG. 2 and a downstream evaluation unit (EVAL) 32, as well as a sequence providing unit (SEQ) 33 connected to correlation unit 31.

Sequence providing unit 33 has a memory means 34, which is connected to correlation unit 31 and whose size is dimensioned in such a way that precisely one of the derived sequences can be stored. In the case of the derived sequences F0, F1, F2, ..., explained with reference to the above table, memory means 34 is therefore suitable for storing 32 chip values. In binary chips, this means a memory space requirement of only 32 bits.

Preferably, the memory means is made as a feedback shift register 34 with a total of 32 register cells 34-0, 34-1, ..., 34-31 for storing one chip value each of a derived sequence. In FIG. 3, a state of shift register 34 is drawn in by way of example in which the register cells 34-0, 34-1, ..., 34-31 from left to right have the chip value "+++−−− ..." of the derived sequence F0 from the above table (whereby, e.g., the chip value "+1" is saved as a binary one and the chip value "−1" as a binary zero). If the register cells of the shift register are now clocked in the chip clock fC=2 MHz (not shown in FIG. 3), then the stored content of the register cells per chip period TC=1/fC=500 ns shifts left by one register cell, so that the derived sequence F0 is provided at the output of the first register cell 34-0 in the next 32 chip periods (i.e., in the following symbol period TS=32*TC). Because of the feedback in the shift register, the shift of the content occurs cyclically, which is why the derived sequence F0 then repeats in continuous clocking (periodic continuation).

As explained above with reference to the table, the other derived sequences F1, F2, ..., F7 of the third group FG1 differ from the derived sequence F0 only by a cyclic shift. The derived sequences F1, F2, ..., F7 can therefore either be tapped also at the output of the first register cell 34-0 (then however beginning later in time than F0) or at the outputs of other register cells (with or without a time offset in regard to F0).

FIG. 3 shows the register cells at which the other derived sequences F1, F2, ..., F7 of the third group FG1 are tapped, when they are to be provided simultaneously, i.e., within the same time interval as the second sequence F0. According to the previously explained table, e.g., the derived sequence F7 begins with a bit pattern that has five times the value −1. This bit pattern is evident in the derived sequence F0 beginning with the fifth chip, i.e., beginning with the chip F0c4. For this reason, the feedback shift register 34 of FIG. 3 provides the derived sequences F0 and F7 precisely simultaneously when F7 is tapped at the output of the fifth register cell 34-4 and F0—as already described—at the output of the first register cell 34-0. Analogous observations show that the additional derived sequences F1, F2, ..., F6 of the third group FG1 are provided simultaneously at the outputs of register cells 34-28, 34-24, 34-20, 34-16, 34-12, or 34-8, as shown in FIG. 3. For the simultaneous provision of the group of eight and derived sequences F0, F1, ..., F7, therefore according to FIG. 3, eight outputs of sequence providing unit 33 are provided, which are connected to the outputs of register cells 34-0, 34-28, 34-24, 34-20, 34-16, 34-12, 34-8, or 34-4.

It is possible in this way by means of a feedback shift register 34 having only 32 register cells, which is initialized, e.g., with the chip values of the derived sequence F0, to realize an extremely simple and power-saving sequence providing unit 33, which is suitable for providing all derived sequences F0, F1, ..., F7 of the third group FG1 simultaneously (i.e., without a time offset). According to the invention, the eight derived sequences F8, F9, ..., F15 of the fourth group FG2 are not provided. This simplifies substantially the realization of correlation unit 31 and evaluation unit 32, as is described in greater detail hereinafter.

Correlation unit 31 has eight multiplier units 35-0, 35-1, ..., 35-7, each with two inputs and also eight integration units 36-0, 36-1, ..., 36-7, each downstream of a multiplier unit.

The first inputs of multiplier units 35-0, 35-1, ..., 35-7 are supplied with the same signal, namely, the (optionally equalized) demodulated signal s (cf. FIG. 2): $s0=s1=s2=\ldots=s7=s$. The second inputs of multiplier units 35-0, 35-1, ..., 35-7 are connected to the outputs of register cells 34-0, 34-28, 34-24, 34-20, 34-16, 34-12, 34-8, or 34-4 of feedback shift register 34, so that they are supplied simultaneously (parallel) with the derived sequences F0, F1, ..., or F7 of the third group FG1.

The operating mode of the i-th branch of the correlation unit will be explained hereinbelow, whereby i=0, 1, ..., 7. Multiplier unit 35-i multiplies the values, present in the chip clock fC, of the (optionally equalized) demodulated signal s with the chip values of the derived sequence Fi and thus calculates a product signal ti, which in turn has values in the chip clock $fC=1/TC$. Thus, 32 signal values of the product signal ti are generated per symbol period $TS=32*TC$. The downstream integration unit 36-i adds per symbol period 31 of these 32 signal values of the corresponding product signal ti and thus provides a correlation result rsFi per symbol period.

During the addition of the 31 signal values, the first signal value of ti in each case—and therefore, the first chip value Fic0 of the corresponding derived sequence Fi—remains unconsidered in each symbol period. In this chip period per symbol period, which is first in regard to time, the integration unit 36-i is set back, and therefore the following integration starts with the value zero.

Based on the differential demodulation, the detection of a current data symbol requires knowledge of the preceding data symbol. If now—as described above—the correlation results are calculated in all branches in such a way that the first chip value F0c0, F1c0, ... of the derived sequences remain not considered, each data symbol can be decided (detected) advantageously independent of the preceding symbol without notable losses in detection efficiency; this reduces further the realization cost of the detection unit.

As can be derived from the previous description, the signal processing in the individual branches of correlation unit 31 occurs without a time offset: all j-th chips of the derived sequences are multiplied with a signal value of s in the same chip period. After the integration, therefore, the correlation results are available simultaneously, i.e., parallel.

According to the previously described table, the derived sequences can assume antipodal values (+1 and −1). The multiplication of the (optionally equalized) demodulated signal s by the antipodal chip values of the derived sequences in this case therefore causes a sign reversal of the values of the demodulated signal s. Therefore, the multiplier units 35-0, 35-1, ... 35-7 are advantageously realized as sign inverters.

Evaluation unit 32 has a parallel maximum value determination unit (MAX) 37, connected to integration units 36-0, 36-1, ..., 36-7, and a downstream allocation unit (MAP) 38.

Parallel maximum value determination unit 37 compares parallel (i.e., substantially simultaneously, e.g., in the same chip period) per symbol period eight correlation results rsF0, rsF1, rsF7 in amount with one another and determines the (signed) value of the maximum-value correlation result rsFmax and a sequence index k with integer values between 0 and 7, which indicates which of the derived sequences F0, F1, ..., F7 of the third group FG1 is to be assigned to this signed value. If, therefore, e.g., the correlation result rsF5 has the maximum-value of all eight correlation results, parallel maximum value determination unit 37 thus determines the signed value rsFmax=rsF5 and the sequence index k=5, which points to the derived sequence F5.

Allocation unit 38 takes into account the fact that in the correlation unit the correlation was performed only with the eight derived sequences F0, F1, ..., F7 of the third group FG1, but not with the eight derived sequences F8, F9, ..., F15 of the fourth group FG2. Because of the above-described property of the derived sequences, according to which for each derived sequence F0, F1, ..., F7 of the third group FG1 there is a derived sequence F8, F9, ..., F15 of the fourth group FG2, which differs only by an inversion of all of its chip values, the correlation result, e.g., for F13, would differ only by the sign from that for F5. For this reason, allocation unit 38 evaluates the sign of rsFmax.

Allocation unit 38 determines from the sequence index k and the sign of rsFmax the value of one of the transmitted data symbols d0, d1, .... If the signed value rsFmax is positive, thus the data symbol value is determined that is assigned the sequence from the first PN sequence P0, P1, ..., P7 of the first group PG1 that is assigned the derived sequence with the sequence index k, i.e., Fk. If the data symbol value d=5, e.g., is assigned the first PN sequence P5 and this in turn, as described above with reference to the table, the derived sequence F5, allocation unit 38 in the above example thus determines the data symbol value as d=k=5, when rsFmax=rsF5>0.

If the signed value rsFmax is negative, however, allocation unit 38 thus determines the data symbol value that is assigned the second PN sequence P8, P9, ..., P15 of the second group PG2 that is assigned the sequence inverse to the derived sequence with the sequence index k (Fk). If the data symbol value d=13, e.g., is assigned the second PN sequence P13 and this in turn, as described above with reference to the table, the derived sequence F13=−F5, allocation unit 38 in the above example thus determines the data symbol value as d=k+8=13, when rsFmax=rsF5≦0.

The exemplary embodiment, described with reference to FIG. 3, of a detection unit of the invention requires only one minimal memory of 32 bits, only 8 instead of 16 multiplier units, which are advantageously made as sign inverters, only 8 instead of 16 integration units, a parallel maximum value determination unit, and a simple allocation unit. The detection unit is therefore simple to realize and is characterized by a very low power requirement. A further simplification will be described hereinbelow with reference to FIG. 4.

Figure 4:
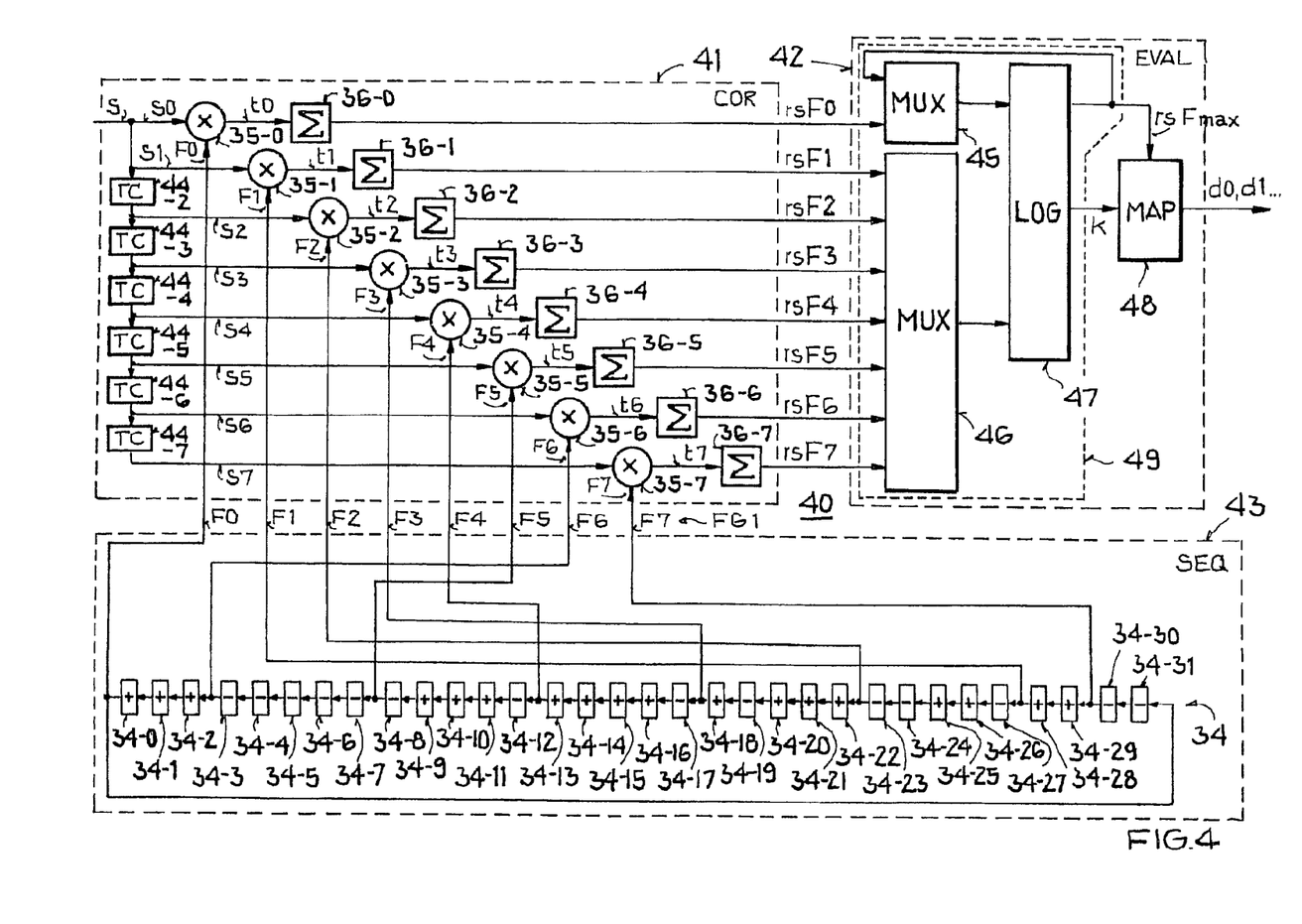
FIG. 4 shows a preferred second exemplary embodiment of a detection unit of the invention.

FIG. 4 shows a block diagram of a preferred second exemplary embodiment of the detection unit of the invention, in which almost all correlation results are provided serially, i.e., one after another in time, and evaluated. Detection unit 40 has a correlation unit (COR) 41 connected to differential demodulator 22 or equalizer 26 of FIG. 2 and a downstream evaluation unit (EVAL) 42, as well as a sequence providing unit (SEQ) 43 connected to correlation unit 41.

Correlation unit 41 per symbol period provides the correlation results rsF0, rsF1 of the first two branches in the same chip period, whereas the remaining correlation results rs F2, ..., rsF7 are each provided in one of the following chip periods. A more cost-effective determination of rsFmax is possible in this way in evaluation unit 42.

Sequence providing unit 43 corresponds substantially to sequence providing unit 33 described in reference to FIG. 3. Reference is made in this respect to the foregoing description. Nevertheless, sequence providing unit 43 provides the derived sequence F2 beginning a chip period later than the derived sequences F0 and F1, by tapping F2 at the output of register cell 34-23 (FIG. 4) instead of 34-24 (FIG. 3), i.e., a chip period later. The derived sequence F3 is provided one chip period after F2 or two chip periods after F0/F1, which is why it is tapped at the output of register cell 34-18 (FIG. 4) instead of 34-20 (FIG. 3). The outputs of the register cells 34-13, 34-8, 34-3, or 34-30 result analogously for the other derived sequences F4, ..., F7. According to FIG. 4, therefore, eight outputs of providing unit 43 are provided, which are connected to the outputs of register cells 34-0, 34-28, 34-23, 34-18, 34-13, 34-8, 34-3, or 34-30, to provide the derived sequences F0 and F1 simultaneously and the derived sequences F2, F3, ..., F7 each offset by one chip period.

Because of the almost identical structure, sequence providing unit 43 is also simple and energy-efficient to realize like sequence providing unit 33 described in reference to FIG. 3. Reference is made in this respect to the foregoing description.

Correlation unit 41 also corresponds substantially to correlation unit 31 described in reference to FIG. 3. Reference is made in this respect to the foregoing description. Nevertheless, correlation unit 41 has in addition six delay elements 44-2, 44-3, ..., 44-7. The delay elements in this case are arranged in series as a so-called "tapped delay line," to which the (optionally equalized) demodulated signal s is supplied. Each delay element in this case provides at its output the signal values of the signal applied at its input delayed by one chip period, so that the demodulated signal s2 delayed by one chip period TC is applied at the output of the first delay elements 44-2, the demodulated signal s3 delayed by two chip periods at the output of the second delay elements 44-3, ... and finally the demodulated signal s7 delayed by six chip periods at the output of the sixth delay elements 44-7.

The first inputs of the two multiplier units 35-0 and 35-1 of the first two branches (index 0, 1) are supplied directly with the undelayed demodulated signal s0=s or s1=s, whereas the first inputs of the remaining multiplier units 35-2, 35-3, ... 35-7 are each connected to the output of the identically indexed delay element 44-2, 44-3, ..., or 44-7, respectively, and thus supplied with the demodulated signal s2, s3, ..., or s7, respectively, delayed by one, two, ..., or six chip periods, respectively. The second inputs of multiplier units 35-0, 35-1, ..., 35-7 are connected to the outputs of register cells 34-0, 34-28, 34-23, 34-18, 34-13, 34-8, 34-3, or 34-30 of feedback shift register 34, so that they are supplied simultaneously with the derived sequences F0 and F1 and the derived sequences F2, F3, ..., F7 delayed relative to F0/F1 by one, two, ..., or six chip periods.

These time delays analogously affect the outputs of the corresponding multiplier units and integration units, so that per symbol period the correlation results rsF0 and rsF1 are provided in the same chip periods, whereas the correlation results rsF2, rsF3, ..., rsF7 are provided with a time delay of one, two, ..., or six chip periods.

Alternatively to the arrangement of the delay elements 44-2, 44-3, ..., 44-7, as shown in FIG. 4, delay elements can also be arranged between the multiplier units and the integration units or, however, (in signal flow direction) after the integration units. Nevertheless, in these cases a delay by one chip period is necessary in the branch with index 2, a delay by two chip periods in the branch with index 3, etc. If the delay elements are arranged after the integration units, signal values that have a greater bit width than the demodulated signal s must be delayed in addition.

As described in reference to FIG. 3, the multiplier units shown in FIG. 4 are advantageously realized as sign inverters. The integration units shown in FIG. 4 also advantageously add per symbol period 31 of the 32 signal values of the particular product signal ti.

Evaluation unit 42 has a serial maximum value determination unit 49, connected to integration units 36-0, 36-1, ..., 36-7, and a downstream allocation unit (MAP) 48.

Serial maximum value determination unit 49 compares serially (i.e., in successive chip periods) per symbol period eight correlation results rsF0, rsF1, rsF7 in amount with one another and determines the (signed) value of the maximum-value correlation result rsFmax and a sequence index k with integer values between 0 and 7, which indicates which of the derived sequences F0, F1, ..., F7 of the third group FG1 is to be assigned to this signed value.

Serial maximum Value determination unit 49 has a first multiplexer (MUX) 45, whose first input is connected to integration unit 36-0, a second multiplexer (MUX) 46 connected input-side to integration units 36-1, ..., 36-7, and a logic unit (LOG) 47 with two outputs, said unit connected input-side to the outputs of the two multiplexers 45, 46, whereby the first output of logic unit 47 is connected to the second input of first multiplexer 45.

Logic unit 47 is designed in such a way that it compares the input values provided by the two multiplexers 45, 46 in amount and determines the signed value of the input value which is higher in amount and provides it to the first output, and determines the sequence index k of the derived sequence to be assigned to this signed value and provides it to the second output. Advantageously, logic unit 47 is formed as a state machine.

First multiplexer 45 is controlled, e.g., by a control unit in such a way that it conducts to its output per symbol period in a specific ("first") chip period the correlation result rsF0 applied at its first input and in the following chip periods the value which is applied at its second input and originates from the first output of logic unit 47.

Second multiplexer 46 is also controlled, e.g., by the aforementioned control unit in such a way that it conducts to its output in the aforementioned "first" chip period the correlation results rsF1 applied at its first input, in the following chip period the correlation result rsF2 applied at its second input, etc.

The correlation results rsF0 and rsF1 are compared with one another in amount in this way per symbol period in the aforementioned "first" chip period and as the result the signed value of the correlation result that is greater in amount and the value of the sequence index k are determined, which indicates whether F0 (then: k=0) or F1 (then: k=1) is to be assigned to this signed value. During the following chip period, the correlation result rsF2 is then compared with the result determined in the preceding chip period and as the new results the signed value that has the higher amount, and the value of the sequence index k are determined, which indicates whether F0 or F1 or F2 is to be assigned to this signed value. In the following chip periods, then in each case one of the correlation results rsF3, . . . , rsF7 is compared with the results determined in the preceding chip period and as the new result the signed value that has the higher amount, and the value of the sequence index k of the derived sequence that is to be assigned to the signed value are determined, until all correlation results are considered and thus the signed value of the maximum-value correlation result rsFmax and the sequence index k, which indicates which of the eight derived sequences F0, F1, . . . , F7 is to be assigned this signed value rsFmax, are determined.

Allocation unit 48 corresponds to allocation unit 38 described in reference to FIG. 3. Reference is made in this respect to the foregoing description.

The exemplary embodiment, described with reference to FIG. 4, of the detection unit of the invention requires only a minimal memory of 32 bits, only 8 instead of 16 multiplier units, which are advantageously made as sign inverters, only 8 instead of 16 integration units, a serial maximum value determination unit which is very simple to realize, and a likewise very simple allocation unit. The detection unit is therefore very simple to realize and is notable for an extremely low power requirement.

Figure 5:
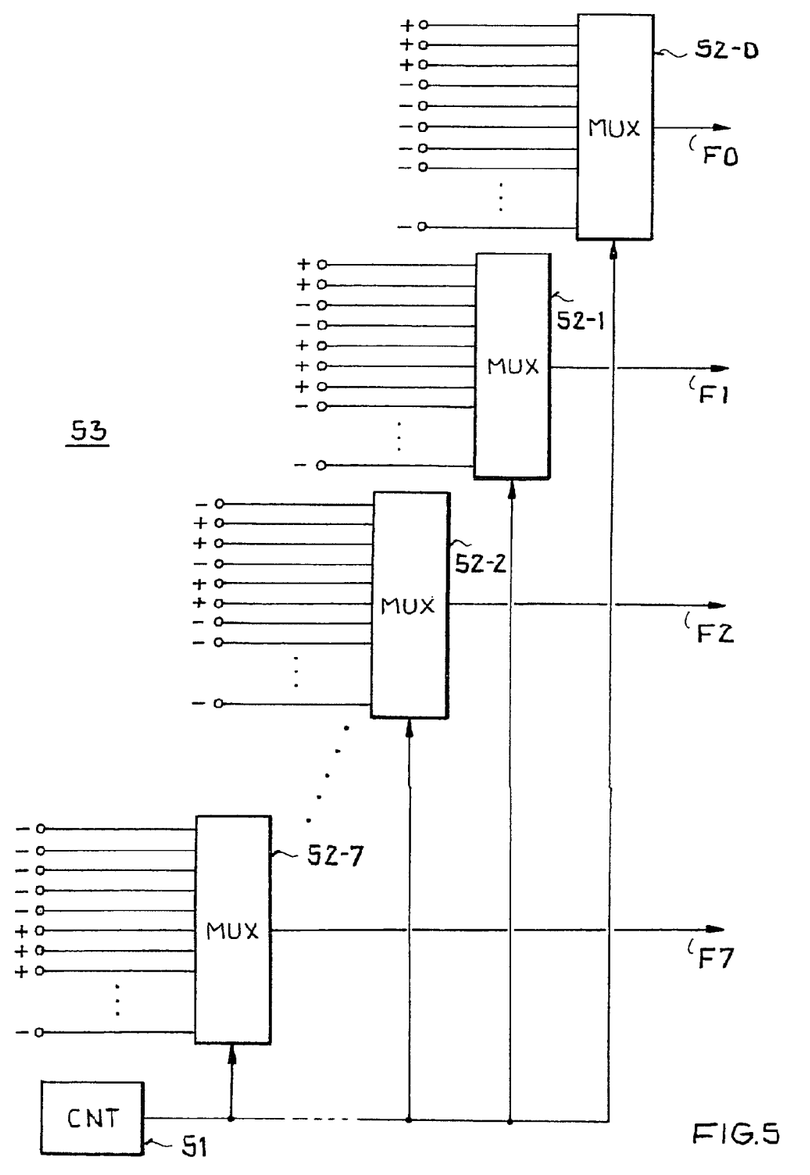
FIG. 5 shows a preferred realization form of the sequence providing unit.

FIG. 5 shows an alternative realization form of the sequence providing unit. Sequence providing unit 53 has a total of eight multiplexers (MUX) 52-0, 52-1, . . . , 52-7, whose control input is connected in each case to counting unit (CNT) 51. Whereas the derived sequences F0, F1, . . . , F7 are provided at the outputs of the multiplexers, the 32 inputs per multiplexer have fixed values (such as, e.g., of the supply voltage and ground), which represent the specific derived sequence. In analogy to the "current" content of the register cells 34-0, . . . , 34-31 of shift register 34 from FIGS. 3 and 4, the input values of multiplexers 52-0, 52-1, . . . , 52-7 in FIG. 5 are represented by plus and minus symbols. In this case, the sequence "+++−−−−− . . . −", drawn from top to bottom at the inputs of multiplexer 52-0 in FIG. 5, corresponds to the sequence, drawn from left to right in shift register 34 of FIG. 3 in register cells 34-0, . . . , 34-31, and thereby the derived sequence F0. In analogy, the sequence "+−−+++− . . . −", drawn at the inputs of multiplexer 52-1 in FIG. 5, corresponds to the sequence, drawn in register cells 34-28, . . . , 34-31, 34-0, . . . , 34-27 in FIG. 3, and thereby the derived sequence F1, etc. Whereas the plus and minus symbols in the register cells of FIGS. 3 and 4 represent the currently stored value, in FIG. 5 the plus symbol, e.g., represents a connection to the supply voltage and the minus symbol a connection to ground.

Counting unit 51 is formed to count from zero to 31 in the chip clock fC and then to begin again at 0. It therefore provides at its output per symbol period a running chip index (0 . . . 31). In the first chip period (with index zero), therefore, the multiplexers each conduct the value applied at its first (topmost) input to their output, so that in the first chip period the first chip values of the derived sequences are provided simultaneously (F0c0, F1c0, . . . , F7c0). In the next chip periods, the multiplexers each conduct synchronously the values applied at their second, third, etc., inputs, until after all 32 chip periods all derived sequences are provided parallel. Because the provision of the derived sequences occurs without a time offset relative to one another, the sequence providing unit 53 of FIG. 5 can be used directly instead of sequence providing unit 33 in FIG. 3.

By means of a simple modification, sequence providing unit 53 of FIG. 5 can be used instead of sequence providing unit 43 in FIG. 4. For this purpose, only the input values of multiplexers 52-2, 52-3, . . . , 52-7 are to be shifted cyclically; i.e., the inputs of the aforementioned multiplexers are to be wired cyclically shifted. The input values of multiplexer 52-2 are hereby to be shifted cyclically downward in FIG. 5 by one input position, that of multiplexer 52-3 downward by two input positions, etc., and that of multiplexer 52-7 downward by six input positions. In this way, the derived sequences are provided serially analogously to sequence providing unit 43 of FIG. 4, i.e., the derived sequences F0 and F1 in the same chip period, F2 beginning one chip period later, F3 beginning another chip period later, etc. Instead of the preferred cyclic shift of the input values of multiplexers 52-2, 52-3, . . . , 52-7, of course, the output values of counting unit 51, as supplied to said multiplexers, can be delayed accordingly.

The detection unit of the invention described heretofore with reference to FIGS. 2 to 5 and thereby also transmitting/receiving devices, which have this type of detection unit, are notable for a very simple realizability, an extremely low power requirement, and a high efficiency (bit error rate or the like depending on interfering effects such as noise and/or channel distortions). According to tests performed by the applicant, the digital parts of the receiving units—without a synchronization unit—require a hardware effort on the order of a few thousand gate equivalents (NAND gates with two inputs). In the data transmission mode, these digital parts of the receiving units have a power requirement on the order of a few milliwatts (mW).

Although the present invention was described above with reference to exemplary embodiments, it is not limited thereto but can be modified in many ways. Thus, the invention is not limited either to WPANs or to WPANs according to IEEE 802.15.4 or to the PN sequences specified therein (number and length of the sequences, number of levels and values of the chips, etc.), rates and number of levels of the chips/symbols/bits, etc. The invention is also not limited to the derived sequences given in the aforesaid table. Various equivalent logical relationships can be given for the relationship between the derived chips and the PN chips.

LIST OF REFERENCE CHARACTERS 10 data transmission system/"Wireless Personal Area Network" (WPAN) according to the IEEE. Standard 802.15.4
11-13 Transmitting/receiving device, "transceiver"
14 antenna
15 transmitting unit, "transmitter"
16 receiving unit, "receiver"

17 control unit
21 internal receiver
22 differential demodulator
23 correlation unit, despreader
24 evaluation unit, detector
25 sequence providing unit
26 equalizer
28, 30 detection unit
31 correlation unit
32 evaluation unit, detector
33 sequence providing unit
34 memory means; shift register
34-0, 34-1, . . . register cell 0 or 1 . . . of the shift register
35-0, 35-1, . . . multiplier unit 0 or 1 . . .
36-0, 36-1, . . . integration unit 0 or 1 . . .
37 parallel maximum value determination unit
38 allocation unit
40 detection unit
41 correlation unit
42 evaluation unit, detector
43 sequence providing unit
44-2, 44-3, . . . delay element 2 or 3 . . .
45, 46 first or second multiplexer
47 logic unit
48 allocation unit
49 serial maximum value determination unit
51 counting unit
52-0, 52-1, . . . multiplexer 0 or 1 . . .
53 sequence providing unit
CNT counting unit
COR correlation unit, despreader
DEMOD differential demodulator
EQ equalizer
EVAL evaluation unit, detector
IC integrated circuit; chip
iREC internal receiver
ISM industrial, scientific, medical (2.4 GHz frequency band)
LOG logic unit
MAP allocation unit
MAX maximum value determination unit
MUX multiplexer
PN pseudo-noise
QPSK quadrature phase shift keying
RX receiving unit, receiver
SEQ sequence providing unit
TRX transmitting/receiving device, transceiver
TX transmitting unit, transmitter
WPAN wireless personal area network
b complex baseband signal with sampling values in the chip clock
d0, d1, d2, data symbols
fB bit clock (=1/TB)
fC chip clock (=1/TC)
fS symbol clock (=1/fS)
F0, F1, F2, . . . derived sequences, F-/FSK sequences, second codes (receive-side)
F5c0, F5c1, chips of the derived sequence ("derived chips") F5
FG1 third group of derived sequences F0, . . . , F7
FG2 fourth group of derived sequences F8, . . . , F15
i, j, k indexes
n number of the (derived) sequences in the third group
P0, P1, P2, . . . PN sequences, spreading sequences, first codes (transmit-side)
P0, P1, . . . , P7 first PN sequences
P8, P9, . . . , P15 second PN sequences
P5c0, P5c1, chips of the PN sequence ("PN chips") P5
PG1 first group of first PN sequences P0, . . . , P7
PG2 second group of second PN sequences P8, . . . , P15
r radio signal, incoming signal
rsF0, rsF1, correlation results
rsFmax maximum-value correlation result (signed)
s differentially demodulated (and optionally equalized) signal; soft-information values
s0, s1, . . . signal values of the signal s present in the chip clock
t0, t1, product signals
TB bit period (=1/fB)
TC chip period (=1/fC)
TS symbol period (=1/fS)

The invention claimed is:

1. A detection unit for detecting data symbols which are contained in a differentially demodulated signal and to which transmit-side in each case a pseudo noise (PN) sequence from a sequence set is assigned, which has a first group of first PN sequences and a second group of second PN sequences, whereby the first and second PN sequences within their respective group differ from one another only by a cyclic shift in their chip values and whereby the second group for each first PN sequence has a corresponding second PN sequence, which differs from the first PN sequence only by an inversion of each second chip value, comprising:
 a) a sequence providing unit, which is formed to provide a third group of derived sequences, the sequence providing unit having a counting unit and multiplexers connected to the counting unit, whereby fixed values are applied at the inputs of the multiplexers and the sequence providing unit is formed to provide the derived sequences of the third group at the outputs of the multiplexers;
  whereby the third group for each first PN sequence has a derived sequence, which is assigned to said first PN sequence and is derived therefrom by means of logic operations, but is not identical thereto; and
  whereby the derived sequences of the third group differ from one another only by a cyclic shift in their chip values;
 b) a correlation unit which is connected to the sequence providing unit and is formed to calculate correlation results by correlating the differentially demodulated signal with each derived sequence of the third group; and
 c) an evaluation unit which is connected to the correlation unit and is formed to derive the values of the data symbols by evaluating the correlation results.

2. The detection unit according to claim 1, characterized in that the sequence providing unit has precisely one memory means, which is fainted to store precisely one of the derived sequences of the third group.

3. The detection unit according to claim 2, characterized in that the memory means has a feedback shift register.

4. The detection unit according to claim 3, characterized in that means are provided for clocking the feedback shift register in the chip clock and the sequence providing unit is formed to provide the derived sequences of the third group at the outputs of the specific register cells of the feedback shift register.

5. The detection unit according to claim 1, characterized in that the third group has at least two derived sequences and their number n coincides with the number of the first PN sequences in the first group and with the number of the second PN sequences in the second group.

6. The detection unit according to claim 5, characterized in that the correlation unit has the following units:
 a) n multiplier units, each connected to the sequence providing unit, for calculating n product signals by multiplying signal values present in the chip clock, of the demodulated signal by chip values in each case of one of the derived sequences of the third group; and b) n integration units, each connected to one of the multiplier units, to provide correlation results per symbol period by adding a number of signal values in each case of one of the n product signals.

7. The detection unit according to claim 6, whereby the multiplier units consist of means for sign reversal.

8. The detection unit according to claim 6, wherein the integration units are formed to add a number of signal values that is smaller by one than the number of chips, which has each derived sequence.

9. The detection unit according to claim 6, characterized in that the evaluation unit is formed to evaluate in parallel n correlation results per symbol period by evaluating the n correlation results substantially simultaneously.

10. The detection unit according to claim 9, characterized in that the evaluation unit has the following units:
   a) a parallel maximum value determination unit, which is connected to the integration units and is formed to compare the n correlation results with one another substantially simultaneously in amount and to determine as the result the signed value of the maximum-value correlation result and a sequence index, which indicates which of the n derived sequences is to be assigned to said signed value; and
   b) an allocation unit, which is connected to the parallel maximum value determination unit and is formed to determine a value of one of the data symbols from the sequence index and the sign of the signed value of the maximum-value correlation result.

11. The detection unit according to claim 10, wherein the allocation unit is formed to determine the value of one of the data symbols
   a) to which the first PN sequence of the first group is to be assigned that is assigned the derived sequence with the sequence index, if the signed value of the maximum-value correlation result is positive; and otherwise
   b) to which the second PN sequence of the second group is assigned that is assigned the sequence inverse to the derived sequence with the sequence index.

12. The detection unit according to claim 6, characterized in that
   a) the third group has at least four derived sequences;
   b) the correlation unit has delay elements, which are arranged in such a way that per symbol period two first results of the correlation results are provided in the same chip period and n−2 second results of the n correlation results in the following chip periods; and
   c) the evaluation unit is formed to evaluate serially the n correlation results per symbol period by evaluating the first correlation results during a first chip period and one each of the second correlation results during the following chip periods.

13. The detection unit according to claim 12, characterized in that the delay elements are arranged in the signal path upstream of the multiplier units.

14. The detection unit according to claim 12, characterized in that the evaluation unit has the following units:
   a) a serial maximum value determination unit, which is connected to the integration units and is formed:
      to compare the first correlation results in amount with one another during the first chip period and to determine as the result the signed value of the first correlation result that has the highest amount, and a sequence index which indicates which of the derived sequences is to be assigned to this signed value;
      in the following chip periods, to compare one each of the second correlation results in amount with the result determined in each case during the preceding chip period and to determine as the result the signed value that has the highest amount, and a sequence index which indicates which of the derived sequences is to be assigned to this signed value;
      to perform the preceding step so often until all second correlation results are considered and thus the signed value of the maximum-value correlation result and a sequence index are determined, which indicates which of the n derived sequences is to be assigned to this signed value; and
   b) an allocation unit, which is connected to the serial maximum value determination unit and is formed to determine a value of one of the data symbols from the sequence index and the sign of the signed value of the maximum-value correlation result.

15. The detection unit according to claim 14, characterized in that the serial maximum value determining unit has the following units:
   a) a first multiplexer, which is connected to a first integration unit and is controlled in such a way that it conducts to its output during the first chip period the first correlation result applied at its first input and in the following chip periods the value applied at its second input;
   b) a second multiplexer, which is connected to n−1 second integration units and is controlled in such a way that it conducts to its output during the first chip period the first correlation result applied at its inputs and in the following chip periods one each of the second correlation results applied at its other inputs; and
   c) a logic unit having two outputs and connected to the outputs of the two multiplexers, whereby the first output is connected to the second input of the first multiplexer and the logic unit is designed in such a way that it compares the values in amount conducted by the two multiplexers and determines the signed value of the higher value in amount and provides it at the first output, and determines the sequence index of the sequence to be assigned to said signed value and provides it at the second output.

16. The detection unit according to claim 15, wherein the logic unit has a state machine.

17. The detection unit according to claim 1, wherein each derived sequence has derived chips, whose values in each case of a logic operation of the particular PN chips correspond to the first PN sequence assigned the derived sequence.

18. The detection unit according to claim 17, characterized in that the derived chips with a first positive index each have a value derived from an XOR operation of the PN chip with said first positive index with the PN chip preceding index-wise.

19. The detection unit according to claim 17, characterized in that the index-wise first derived chip has a value that is derived from an XOR operation of the index-wise first PN chip with the index-wise last PN chip.

20. The detection unit according to claim 18, wherein:
   a) the derived chips with an even index each have a value that is assigned to the value of the respective XOR operation; and
   b) the derived chips with an odd index each have a value that is assigned to the inverted value of the respective XOR operation.

21. A transmitting/receiving device, particularly for a data transmission according to the IEEE Standard 802.15.4 in the 2.4 GHz band, comprising:
   a) an antenna;
   b) a transmitter unit connected to the antenna to transmit data particularly according to the IEEE Standard 802.15.4 in the 2.4 GHz band, wherein the transmitting unit is formed to assign to each data symbol a pseudo noise sequence from a sequence set, which has a first group of first PN sequences and a second group of second PN sequences, whereby the first and second PN sequences within their respective group differ from one another only by a cyclic shift in their chip values and whereby the second group have for each first PN sequence a corresponding second PN sequence, which differs from the first PN sequence only by an inversion of every second chip value;
   c) a receiving unit, connected to the antenna, with a differential demodulator and a detection unit, the detection unit including a sequence providing unit, which is formed to provide a third group of derived sequences, the sequence providing unit having a counting unit and multiplexers connected to the counting unit, whereby fixed values are applied at the inputs of the multiplexers and the sequence providing unit is formed to provide the derived sequences of the third group at the outputs of the multiplexers; and
   d) a control unit, connected to the transmitting unit and the receiving unit, for controlling the transmitting unit and the receiving unit.

* * * * *

UNITED STATES PATENT AND TRADEMARK OFFICE
CERTIFICATE OF CORRECTION

PATENT NO. : 8,107,513 B2  
APPLICATION NO. : 11/917150  
DATED : January 31, 2012  
INVENTOR(S) : Frank Poegel, Tilo Ferchland and Thomas Hanusch Page 1 of 1

It is certified that error appears in the above-identified patent and that said Letters Patent is hereby corrected as shown below:

In the Claims:

Column 20, Line 49 after "means, which is" delete "fainted" and insert -- formed --.

Column 23, Line 9 after "noise" insert -- (PN) --.

Signed and Sealed this  
Third Day of December, 2013

Margaret A. Focarino  
*Commissioner for Patents of the United States Patent and Trademark Office*